(12) United States Patent
Jousse et al.

(10) Patent No.: US 7,834,548 B2
(45) Date of Patent: Nov. 16, 2010

(54) LUMINOUS STRUCTURE COMPRISING AT LEAST ONE LIGHT-EMITTING DIODE, ITS MANUFACTURE AND ITS APPLICATIONS

(75) Inventors: Didier Jousse, Taverny (FR); Jean-Clement Nugue, Lamorlaye (FR)

(73) Assignee: Saint-Gobain Glass France, Courbevoie (FR)

(*) Notice: Subject to any disclaimer, the term of this patent is extended or adjusted under 35 U.S.C. 154(b) by 109 days.

(21) Appl. No.: 12/159,661

(22) PCT Filed: Dec. 27, 2006

(86) PCT No.: PCT/FR2006/051431
§ 371 (c)(1),
(2), (4) Date: Sep. 24, 2008

(87) PCT Pub. No.: WO2007/074318
PCT Pub. Date: Jul. 5, 2007

(65) Prior Publication Data
US 2009/0174300 A1    Jul. 9, 2009

(30) Foreign Application Priority Data
Dec. 29, 2005  (FR)  .................................. 05 13446

(51) Int. Cl.
*H01J 1/62*    (2006.01)
(52) U.S. Cl. ...................................... 313/506; 313/498
(58) Field of Classification Search ................ 313/498, 313/506
See application file for complete search history.

(56) References Cited

U.S. PATENT DOCUMENTS

| 2002/0001192 A1 | 1/2002 | Suehiro et al. |
| 2004/0070989 A1 | 4/2004 | Amano et al. |

*Primary Examiner*—Vip Patel
(74) *Attorney, Agent, or Firm*—Oblon, Spivak, McClelland, Maier & Neustadt, L.L.P.

(57) ABSTRACT

A luminous structure includes at least one light-emitting diode emitting radiation within the ultraviolet or the visible spectrum, a substantially planar glass element having main faces and an edge around a periphery of the main faces. The glass element includes a hole housing the diode, and a metallic element connected to the diode and coupled with said glass element for removing heat. The metallic element is chosen from an electrical connection element or a holding element for keeping the diode in said hole. The invention also relates to the manufacture of this luminous structure and to its applications.

31 Claims, 4 Drawing Sheets

LUMINOUS STRUCTURE COMPRISING AT LEAST ONE LIGHT-EMITTING DIODE, ITS MANUFACTURE AND ITS APPLICATIONS

BACKGROUND OF THE INVENTION

I. Field of the Invention

The present invention relates to a luminous structure and in particular to a luminous structure comprising at least a first light-emitting diode, to the process for manufacturing this structure and to its applications.

II. Description of Related Art

Various illuminating planar structures incorporating a plurality of light-emitting diodes (LEDs) exist.

Firstly, luminous structures with direct illumination are known. In a first known configuration, the light-emitting diodes are placed on a main face of a monolithic planar glass pane having transparent electrodes, the electrodes being connected to the electrical contacts of the diodes by soldered wires. In a second known configuration, the diodes are assembled on a plastic printed circuit board (PCB) which is inserted into a laminated glass pane.

Also known are luminous structures with illumination via the edge. They comprise a plurality of light-emitting diodes housed in a groove having a concave profile made in the edge of a planar glass pane. The diodes are assembled on a planar support, made of epoxy, parallel to the edge.

The Applicant has found that these luminous structures of the prior art have at least one of the following drawbacks:
  lack of compactness, especially a size problem;
  design complexity (number and shape of the parts, number of manufacturing steps, production difficulties);
  risk of breaking or damaging the diodes and/or the electrical connection elements; and
  problems of diode heat-up and sensitivity of the diodes to temperature (which reduces the lifetime of the diodes and/or their reliability) and to moisture and to any other corrosive factor.

BRIEF SUMMARY OF THE INVENTION

The aim of the present invention is to provide a luminous structure having one or more light-emitting diodes—with direct illumination and/or illumination via the edge—which is both reliable and of simple design while being the most compact and/or light as possible.

Thus, the aim of the present invention is to provide a luminous structure having one or more light-emitting diodes that meets the industrial requirements (in terms of yield, and therefore cost, production rate, automatability, etc.), thus making "low cost" production possible without sacrificing performance.

The invention also proposes to broaden the range of products available—products that are provided with novel functionalities and/or are dedicated to novel applications.

For this purpose, the present invention proposes a luminous structure comprising:
  at least one light-emitting diode capable of emitting radiation within the ultraviolet (UV) and/or the visible;
  a substantially planar glass element having main faces and an edge, the glass element having a hole housing the diode; and
  a metallic element connected to the diode and coupled with said glass element for removing heat, said metallic element being furthermore chosen from an electrical connection element and/or a holding element for keeping the diode in said hole.

Thus, the present invention proposes a luminous structure having a light-emitting diode, of simple, compact and robust design and with good thermal resistance.

The luminous structure may be large. For example, the main surfaces have an area of at least $1\ m^2$.

The metallic element may be, entirely or partly, in direct contact with at least one of the main faces and/or with the edge and/or with the side wall(s) forming the hole.

The metallic element may also be, entirely or partly, in indirect contact with at least one of the main faces and/or with the edge and/or with the side wall(s) forming the hole.

For example, a functional element having one or more layers and/or one or more wires, especially one or more electrodes, a power supply member, a mirror or a decoration, especially based on a white or colored nonconducting enamel, is inserted between the glass element and the metallic element.

This functional element is sufficiently thin and/or of suitable nature for allowing the heat to be discharged via the glass element.

This functional, preferably planar, element is for example located on one or both main faces.

The structure may thus incorporate all functionalities known in the glazing field. Among functionalities, mention may be made of the following: hydrophobic/oleophobic layer, hydrophilic/oleophilic layer, antisoiling photocatalytic layer, stack reflecting the thermal radiation (or solar control) or infrared radiation (for low emissivity) or antireflection layer.

In the present invention, the term "layer" may mean either a single layer or a multilayer.

Furthermore, to optimize the coupling, the metallic element may preferably have a contact area as large as possible, for example a rounded surface.

The contact area may preferably be greater than $5\ mm^2$, in particular when the diodes have a high power, i.e. greater than 0.2 W and for example up to 5 W, or a high luminosity, i.e. greater than 5 lumens and for example up to 500 lumens.

For greater compactness, the metallic element may be incorporated into the hole or flush with the hole.

For greater compactness and/or simplified design and/or better thermal coupling, the metallic element may furthermore have one or more of the following features:
  it is a piece made as a single part, for example a monoblock piece;
  it is a discontinuity piece, made of several parts, especially two parts, preferably with, for each part, a planar end and in contact (directly or indirectly) with a main face or with the edge with the hole, this end (leads, etc.) preferably being in contact with an electrode or a power supply member;
  it is elongate or is a section;
  it has an L-shaped, T-shaped or E-shaped cross section, or two L-shaped cross sections, especially so as to act as an element for holding or optically aligning the diode(s);
  it is flexible or folded, especially so as to act as a holding element;
  it is thin, especially with a thickness of 0.2 mm or less;
  it is opaque, made of copper or stainless steel;
  it is reflective, for example made of aluminum, or has a reflective surface, for example an aluminum or silver layer, for redirecting the radiation;
  it is associated with several diodes, especially as a common holding element or as a common electrical element for connection to a single electrode;

it covers the diode or diodes so as to protect them and/or mask them, it optionally being pierced so as to fill the hole with index resin or sealant (silicone, etc.); and it extends right along a hole, forming a groove.

In particular, the metallic element which is an electrical connection element may be connected via a conductive adhesive—especially one based on silver, via a spot of solder—directly to the rear face of the semiconductor chip—or the lateral face if the chip is a side-emitting chip. This connection may extend over all or part of the face of the chip (on the edge, at the center, etc.). This direct connection is strong, makes it possible to limit the number of electrical connections and the length of the connection circuit (especially to dispense with wires) and prevents any dissipation or short circuit or any risk of a break in contact near the diode.

In particular, the metallic element which is a holding element may:

be assembled with a thin and planar, conducting base supporting the diode or diodes;

be self-blocking in the chosen hole having a retaining profile, for example having a part with a shape approximately complementary to that of the lateral wall forming the hole, be forcibly mounted, snap-fastened or deformed, for example with coplanar tabs that are bent over when being engaged in the hole; and comprise, for alignment and fastening of the diode, a spring in contact with the diode, approximately perpendicular to the face or to the edge with the hole and preferably held in place along its axis by guiding means.

The hole may be placed on the edge or on one of the main faces.

When the hole is in the edge, the element for holding the source may comprise three substantially planar portions:

two main portions in contact with the main faces; and a side portion in contact with the coupling part of the edge, said holding element being capable of gripping the edge or the two main portions being provided with tabs that engage in notches made on the main faces.

For better heat dissipation control, the metallic element (in particular a hole in a main face) may be covered with:

an electrically insulating, thermally conducting and optionally adhesive element, especially a film or sheet based on a silicone that includes (in sufficient amount) mineral (aluminum, etc.) fillers or a fabric, for example made of glass fibers impregnated with silicone that includes mineral fillers; and a metallic foil (or film) made of copper, graphite, aluminum or silver.

As electrically insulating film with a good thermal conductivity, mention may be made of products of the TC300™ series of the ThermaCool™ range from Saint-Gobain Norton that are conformable and of variable hardness.

As adhesive, an acrylic resin may be used.

The hole may be a lateral groove, along the edge, optionally emergent on at least one side so as to make it easy to mount and/or insulate the conducting zones.

Moreover, the hole may have a retaining profile (in other words a retaining cross section) so as to make it easy to fasten the source. The retaining profile is for example frustoconical or curved, concave toward the inside, especially in the form of a cup, of T-shape, or clamping hole. The bottom of the hole is optionally faceted (V-shaped).

The cup shape allows the forces to be better distributed in the case of fastening the structure by connecting elements.

The retaining profile may also be approximately in the form of a rhombus or a square or schematically "<>"-shaped, i.e. with two Vs turned through 90° on one of the main faces or on the edge.

Moreover, the hole may have one of the following features:

it is wide, especially with a width of 2 mm or more, especially to facilitate the subsequent deposition of an electroconductive layer or the placing of one or more conducting wires in the bottom;

it is bored so as to receive, and preferably house, the metallic element and preferably one or more electrodes and/or a power supply member;

it has a geometry providing a shadowing effect during subsequent deposition of a layer, so as to create a break between an electroconductive layer deposited on the surface (by CVD, magnetron sputtering, etc.) and a layer deposited on the bottom, so as in particular to form electrodes for diodes with electrical contact on opposed faces of the chip.

The structure may comprise a plurality of diodes supplied with voltage or, to reduce dissipation, supplied with current, preferably via a discontinuous electroconductive track, or even more preferably obtained by ink jet deposition of a material filled with metallic, especially silver or copper, (nano)particles.

If the diodes have electrical contacts on one and the same face of the chip, the discontinuity is obtained simply thanks to the holes, the track extending on either side of the holes. The track may be straight if the diodes are aligned.

If the diodes are arranged in a groove and have electrical contacts on opposed faces of the chip, a discontinuous electroconductive track or a discontinuous electrical wire may be used in the bottom of the groove. The metallic elements, for example of L-shaped cross section, may serve for the connections with the electroconductive tracks placed on one side of the groove.

In one embodiment, the luminous structure according to the invention may comprise first and second electrodes optionally in contact with the metallic element, placed respectively on one and the same main face, or on both main faces, and/or in the bottom of the hole and outside the hole.

At least one of the first and second electrodes may also have one or more of the following additional functions:

it reflects the visible or the UV;

it reflects the thermal radiation so as to provide solar control, or reflects the infrared for a low-emissivity function;

or else it forms an electrode of an optoelectronic element associated with the luminous structure (electrochromic element or switchable mirror, especially consisting of multilayer systems), for example for varying the color, the transparency or the transmission or reflection properties of the light.

Moreover, at least one of the first and second electrodes may cover substantially the associated main face, especially for making it easier and simpler to connect the power supply members, for example those located on the periphery.

At least one of the first and second electrodes may furthermore be chosen to be transparent or translucent, in particular for applications in the illumination field.

At least one of the first and second electrodes may comprise an (electro)conductive layer. This conductive layer may be opaque, reflective, semitransparent, for example metallic, based on silver, or transparent, based on a conductive metal oxide or having electron vacancies, especially made of fluorine-doped tin oxide ($SnO_2$:F), mixed indium tin oxide (ITO)

or indium-doped or aluminum-doped zinc oxide. This conductive layer may also be made of a conductive polymer.

This conductive layer may be deposited by any means known to those skilled in the art, such as by liquid deposition, by vacuum deposition (magnetron sputtering or evaporation), by pyrolytic deposition (powder or gas) or by screen printing.

In one advantageous embodiment, the luminous structure comprises a thin conductive, especially metallic, layer of low emissivity and/or solar control, which is covered with one or more thin dielectric layers and is optionally inserted between thin dielectric layers, said thin conductive layer at least partly forming one of the first and second electrodes.

Thus, this thin conductive layer, for example with a thickness of a few nanometers or around 10 nanometers, may be a (sole) layer based on gold, palladium or preferably silver, optionally incorporating other metals in minor amounts.

The stack may comprise a plurality of thin conductive layers optionally having different functionalities (solar control in the case of one layer and low emissivity for another layer located further to the inside).

The thin dielectric layer or layers above the (last) conductive layer, having a thickness of a few nanometers or around 10 nanometers, are for example based on the following materials:

silicon nitride, carbonitride, oxynitride or oxycarbonitride;
optionally doped metal oxides (for example zinc oxide or tin oxide).

This or these dielectric layers are capable of maintaining electrical conduction between the thin conductive layer and the metallic element of the chip, for example because they are sufficiently thin and/or sufficiently leaky.

The stack is preferably transparent, but not necessarily symmetrical, and preferably does not have a mechanical protection layer for promoting electrical conduction.

As examples of stacks with a thin functional layer, mention may be made of the stacks described in the documents EP 718 250 and EP 877 006 incorporated here by reference.

As examples of stacks with several thin functional layers, mention may be made of the stacks described in the documents EP 847 965, WO 03/010105, EP 1 060 876 and WO 01/20375 incorporated here by reference.

At least one of the first and second electrodes may comprise a wire or even a conducting array formed from a plurality of wires (or lines) in one and the same orientation or in different orientations, or else two cross arrays of parallel wires forming a mesh.

If necessary, the width of the wires (or lines) may be limited:

so as to make the wires as discrete as possible to the naked eye, if the electrode material is relatively opaque to the radiation; and/or
to prevent the emission of radiation being impaired.

For example, a width $l1$ of the wire (or line) of 500 μm or less is chosen, preferably a width of 200 μm, or even 50 μm or even 10 μm. This depends on the minimum distance of the observer (for example, always at more than 2 meters, or closer).

More broadly, this array may be defined by a width $l1$ of features (maximum width in the case of a plurality of widths) and a given pitch $p1$ between features (minimum pitch in the case of a plurality of pitches).

It is thus possible to obtain overall transparency (in the UV or visible) using an array of conducting features and by adapting, depending on the desired transparency, the width $l1$ and/or the pitch $p1$.

Thus, the width $l1$/pitch $p1$ ratio may be equal to 50% or less, preferably 10% or less and even more preferably 1% or less.

For example, the pitch $p1$ may be between 5 μm and 2 cm, preferably between 50 μm and 1.5 cm and even more preferably 100 μm and 1 cm, and the width $l1$ may be between 1 μm and 1 mm, preferably between 10 and 200 μm or even between 10 and 50 μm.

To give an example, an array of conducting lines, for example made of copper, may be used with a pitch $p1$ of 100 μm and a width $l1$ of 10 μm, said array being on a glass sheet. The array may also be screen-printed.

It is also possible to use an array of conducting wires on a glass sheet choosing a pitch $p1$ of between 1 and 10 mm, especially 3 mm, and a width $l1$ of between 10 and 200 μm, especially between 10 and 50 μm or even between 20 and 30 μm.

For the power supply, the structure according to the invention may comprise power supply members coupled to the first and second electrodes and especially in the form of screen-printed busbars made of silver enamel, preferably placed on the border of the dielectric element and especially on the border of a main face.

It is also possible to use wires (made of copper, etc.), plugs, shims, cables, etc.

In one advantageous embodiment, at least one electrode and/or power supply member (especially for supplying current) is a track obtained by ink jet deposition of a material filled with metal, especially silver or copper, (nano)particles or is screen-printed.

These techniques have the advantage of forming a kind of conductive adhesive. This may promote:

thermal contact between the metallic element, when chosen as electrical connection element, and the dielectric element; and/or
retention of the diode in the hole for a metallic element when chosen as holding element.

The diode or diodes may be encapsulated, i.e. they may comprise a semiconductor chip and an envelope, for example made of a resin of the epoxy or PMMA type, encapsulating the chip, and the functions of which are multifarious: protection from oxidation and moisture, diffusing or focusing element, wavelength conversion, etc.

The diodes may also be simple semiconductor chips, for example with a size of the order of around 100 μm or 1 mm, thereby making direct connection with the metallic element possible, simplifying the arrangement and reducing the cost of the structure.

However, the diode may include a partial protective envelope, leaving the first and second contacts free, for example for protecting the chip when being handled or for improving the compatibility between the materials of the chip and other materials.

The diode may in particular be chosen from at least one of the following light-emitting diodes:

a diode with electrical contacts on the opposed faces of the chip or on one and the same face of the chip;
a side-emitting diode, i.e. with emission parallel to the electrical contact (faces);
a diode whose main emission direction is perpendicular or oblique to the emitting face of the chip;
a diode having two main emission directions oblique to the emitting face of the chip, giving a batwing shape, the two directions preferably being centered on angles between 20° and 40° and between −20° and −40°, with apex half-angles of around 10° to 20°;

a diode having (only) two main emission directions oblique to the emitting surface of the diode, which are for example centered on angles between 60° and 85° and between −60° and −85°, with apex half-angles of around 10° to 30°; and a diode placed for guiding in the edge or for emitting directly via one or both faces, or via the hole (the diode is then an inverted diode).

The emission pattern of a source may be Lambertian.

Typically, a collimated diode has an apex half-angle that may be as low as 2° or 3°.

The diode may be bonded in the hole, with a dielectric adhesive in the bottom of the hole. In particular, for a side-emitting diode, the electrical contacts of the chip of which are then facing the lateral wall or walls forming the hole, it is possible to choose a conducting adhesive, especially one based on silver, to form electrical connections with electrodes on either side of the hole and the contacts of the chip.

To avoid dazzling, an element such as a diffuser may be added in the structure, especially in the form of an additional diffusing layer, especially on the main face opposite that of the hole. The surface of the dielectric element may also fulfill this diffusing function.

The structure may advantageously include a mineral diffusing layer associated with one of the main faces, which is a luminous face (direct illumination or illumination by extraction of the radiation).

The diffusing layer may be made up of elements containing particles and a binder, the binder being used to mutually agglomerate the particles.

The particles may be metal particles or metal oxide particles, the size of the particles may be between 50 nm and 1 µm, and preferably the binder may be a mineral binder for heat resistance.

In a preferred embodiment, the diffusing layer consists of particles agglomerated in a binder, said particles having a mean diameter of between 0.3 and 2 microns, said binder being in a proportion of between 10 and 40% by volume, and the particles forming aggregates, the size of which is between 0.5 and 5 microns. This preferred diffusing layer is particularly described in application WO 01/90787.

The particles may be chosen from semitransparent particles and preferably from mineral particles such as oxide, nitride or carbide particles. The particles will preferably be chosen from silica oxides, alumina oxides, zirconia oxides, titanium oxides and cerium oxides, or a mixture of at least two of these oxides.

For example, a diffusing mineral layer of about 10 µm is chosen.

The structure may include a diode for receiving control signals, especially infrared signals, for remotely controlling this diode.

As already indicated above, diodes may be (pre)assembled on one or more coplanar conducting supports, which are preferably thin, especially with a thickness of 1 mm or less, or even 0.1 mm, which are associated with the metallic elements.

The mineral dielectric element may preferably be a glass element.

Preferably, the transmission factor around the peak of the radiation in the visible or in the UV (perpendicular to the main faces) is 50% or higher, even more preferably 70% or higher and even 80% or higher.

The mineral dielectric element may be opaque if the diode is inverted.

Preferably, when the lightguide is transparent to the radiation, at least one part of the edge, which is not an edge for coupling the radiation into the lightguide, is reflective, preferably metallized.

If the electrodes are on a main face in the form of electroconductive layers, an insulating margin may be provided on the periphery of this face.

The structure may be a multiple glazing unit, especially vacuum glazing or glazing with a layer of air or another gas, or laminated glazing. As standard lamination interlayer, mention may be made of flexible used polyurethane (PU), a plasticizer-free thermoplastic such as the ethylene/vinyl acetate (EVA) copolymer or polyvinyl butyral (PVB). These plastics have for example a thickness between 0.2 mm and 1.1 mm, especially between 0.38 and 0.76 mm.

The structure may comprise laminated glazing formed from said mineral lightguide chosen to be a glass sheet, from a lamination interlayer chosen to be diffusing, for example a translucent PVB for distributing the light, and from a glass back pane optionally with a main external face that is diffusing, by being textured or by an additional layer.

However, the lightguide may preferably be monolithic so as to form a monolithic structure, preferably simple glazing so as to be more compact and/or lighter.

The dielectric element may be very thin or relatively thick, for example from 0.5 to 20 mm in the case of glass.

The dielectric element may be of any shape (rectangular, square, round, oval, etc.) and be flat or slightly curved.

The glass element may preferably be made of clear or extra-clear soda-lime glass. The dielectric element may thus have a light transmission $T_L$ of 90% or higher and preferably 91.5% or higher (in the case of extra-clear glass).

The reader may refer to the application WO 04/025334 for the composition of an extra-clear glass. A soda-lime-silica glass with less than 0.05% Fe(III) or $Fe_2O_3$ may be chosen.

It is preferable to choose the glass DIAMANT from Saint-Gobain, the glass ALBARINO from Saint-Gobain (whether textured or smooth), the glass OPTIWHITE from Pilkington or the glass B270 from Schott.

The glass may be tinted. The glass may optionally have undergone beforehand a heat treatment of the hardening, annealing, toughening or bending type. This glass may be frosted, sandblasted, screen-printed, etc.

The diode may emit UV radiation, as exciter for one or more phosphors, for example UVC radiation (between 200 and 280 nm).

The dielectric element may then be made of a material that transmits the UV radiation, chosen especially from quartz, silica, magnesium fluoride ($MgF_2$), calcium fluoride ($CaF_2$), a borosilicate glass or a glass with less than 0.05% of $Fe_2O_3$.

To give examples, for thicknesses of 3 mm:

magnesium or calcium fluorides transmit more than 80% or even 90% over the entire UV range (UVA, UVB and UVC, VUV);

quartz and certain high-purity silicas transmit more than 80% or even 90% over the entire UV range.

The source may in particular emit UV or near-UV radiation, i.e. between 360 and 400 nm.

Borosilicate glasses, such as BOROFLOAT from Schott, transmit more than 70% over the entire UVA range (for a thickness of 3 mm). Soda-lime-silica glasses with less than 0.05% Fe(III) or $Fe_2O_3$, especially the glass DIAMANT from Saint-Gobain, the glass OPTIWHITE from Pilkington and the glass B270 from Schott, transmit more than 70% or even 80% over the entire UVA range (for a thickness of 3 mm).

Furthermore, a soda-lime-silica glass such as PLANILUX sold by Saint-Gobain has a transmission of greater than 80% at more than 360 nm, which may be sufficient for certain constructions and certain applications.

The structure may include at least one phosphor coating on one or both main faces, the UV radiation exciting the phosphor.

The phosphor material may advantageously be selected or adapted so as to determine the color of the illumination within a wide range of colors. The phosphor or a mixture of phosphors may make it possible to obtain white light, especially using monochromatic diodes in the visible or in the near UV.

All or some of the faces of the dielectric element may be coated with the phosphor material emitting in the visible, so as to constitute juxtaposed light zones and "dark" zones. The phosphor may itself be transparent.

At least one of the first and second electrodes may be based on a material that transmits said UV radiation or may be arranged so as to allow said UV radiation to have an overall transmission if the material absorbs or reflects the UV.

The electrode material transmitting said UV radiation may be a very thin layer of gold, for example with a thickness of around 10 nm, or a layer of alkali metals, such as potassium, rubidium, cesium, lithium or potassium, for example with a thickness of 0.1 to 1 µm, or else an alloy, for example a 25% sodium/75% potassium alloy.

A layer of fluorine-doped tin oxide may also be suitable.

The structure may be essentially mineral, especially for high flux resistance, for example if the diode is a power diode.

The structure according to the invention may be used for decorative, architectural, domestic or industrial illumination, especially to form a flat luminaire, such as an illuminating wall, especially a suspended one, or an illuminating tile or a lamp, especially one of very small thickness. It may also have a night time illumination function or the function of displaying information of all kinds, of the design, logo, alphanumeric signaling type, or other signaling type, for example to form a sign-type panel, etc.

The structure may furthermore have two (partially) luminous faces, especially with guiding via the edge, or a single (partially) luminous face, the other side being absorbent or preferably reflectant.

Diodes may be arranged on the border or may be distributed, whether regularly or not, over the entire surface of the structure according to the invention and optionally constitute decorative patterns or constitute a display, such as a logo or a trademark.

The luminous structure, especially glazing, may be:
intended for buildings;
intended for urban furniture, such as a bus shelter, an indicating or advertising panel, or a balustrade;
intended for highway or urban illumination, for example for a passenger bridge;
intended for an aquarium, a display case, a shop window, a shelf element or a greenhouse;
intended for interior furnishings, in particular a kitchen worktop or a bathroom wall, or a mirror;
used for phototherapy (for the treatment of jaundice, depression, etc.);
intended for a display screen of the computer, television or telephone type;
or else electrically controllable, and especially a backlighting device for a liquid crystal display.

The structure according to the invention may for example be incorporated into domestic electrical equipment, for example a refrigerator shelf or a kitchen worktop.

The structure may also serve as a door, as an office or a store partition, balustrade, building (chassis) wall, or as structural glazing fixed at certain points (of the SPIDER product type sold by Saint-Gobain, etc.), or as glass pane for furniture, glass pane for jewelry display shelves, glass pane for museums.

The structure may be made of glass so as to form a glass door. In particular, it may be a glass door security-protected by the diodes so as to prevent accidents to individuals or the damage of objects. The door may be a sliding door, hinged door, or in two lateral parts for central opening/closing, for access to buildings, municipal transport systems, etc.

In a first embodiment of this door, the structure comprises a plurality of diodes aligned in the hole forming a groove and formed in the main face provided with first and second electrodes, and means for driving the diodes so as to emit the radiation intermittently according to the position of the door, by interrupting the power supply.

For example, one of the electrodes and an associated busbar are discontinuous along the path of a moving mechanical contactor (castor, etc.) connected to detection means (camera, etc.) for detecting an individual or an object moving past the door and/or connected to personal identification means (badge, etc.). The break in power may also occur using a pulsed signal controlled by the detection means.

In a second embodiment of this door, the means for driving the diodes are used to emit radiation of different colors according to the position of the door (for example red or green), by interrupting the power supply.

The structure may also be a lamp with red, green and blue diodes in static control mode. In one embodiment of this lamp, the structure comprises:
 a plurality of first conducting, preferably approximately parallel, tracks connected (via one end, etc.) to a common power supply member, preferably a busbar;
 a plurality of second conducting, preferably substantially parallel, tracks alternating with the first conducting tracks and supplied via another common power supply member (via an end, etc.), preferably a busbar; and
 a plurality of holes, preferably forming grooves, each inserted between first and second adjacent tracks forming first and second electrodes, the holes housing diodes and metallic elements serving as electrical connection and preferably holding elements.

Each row of diodes is for example of a different color, for example red, then green and/or blue.

The structure may preferably be transparent, at least outside the diode zone(s), for example to form an illuminating window.

Furthermore, the diode or diodes may be virtually invisible to the naked eye in the "off" state.

The luminous structure may be luminous glazing for a transport vehicle, for example a windshield, rear window, side window or roof, whether opening or non-opening, rear-view mirror, or protective glass, or for any other terrestrial, aquatic or airborne vehicle.

The insertion of diodes into such glazing especially provides the following indicating functionalities:
 display of luminous indicators intended for the driver of the vehicle or for passengers (for example, an engine temperature alarm indicator in the windshield; an indicator showing that the system for electrically deicing the windows is in operation);
 display of luminous indicators intended for persons outside the vehicle (for example an indicator that the vehicle alarm in the side windows is in operation);
 luminous display on vehicle windows (for example a flashing luminous display on emergency vehicles, security display with low electrical consumption, indicating the presence of a vehicle in danger).

Inserting one or more diodes into automotive glazing especially provides the following illumination functionalities:
  particularly attractive ambient lighting of the interior of the vehicle (for example by integrating the ambient illumination in the glass roof of a vehicle); and
  lights and headlamps in the surface of the glazing (for example integration of the third, stop light into the rear window of the vehicle).

Finally, the invention provides a process for manufacturing the luminous structure as defined above, comprising the following steps:
  machining of the hole;
  deposition of a conductive layer forming two electrodes on one of the main faces; and
  preferably toughening of the glass element.

For the shadowing effect, the deposition is preferably chosen to be PVD (magnetron cathode, etc.) sputtering and/or the machining gives the hole a retention profile, it then being possible for the deposition to be carried out by CVD.

The machining of the hole preferably results in a bore for receiving said metallic element.

An ink jet deposition step may also be provided if the hole is wide enough, for placing the busbar on the electrode in the bottom.

As a variant, an electrode is formed by placing one or more thin wires in the bottom of the hole.

Other details and advantageous features of the invention will become apparent on reading the examples of luminous structures according to the invention, these being illustrated by the following figures:

DETAILED DESCRIPTION OF THE INVENTION

It should be pointed out that, for the sake of clarity, the various elements of the objects shown have not necessarily been drawn to scale.

Figure 1A:
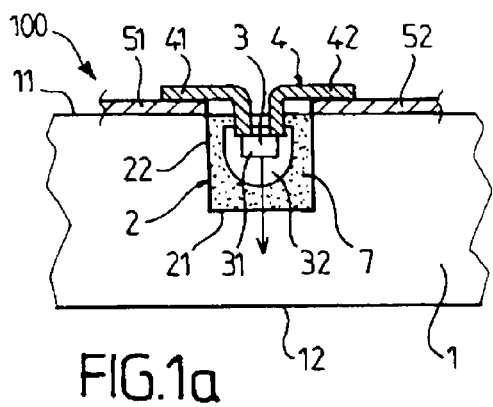
FIGS. 1a and 1b show respectively a schematic, partial sectional view and a schematic, partial top view of a luminous structure 100 having a diode in a first embodiment of the invention.
Figure 1B:
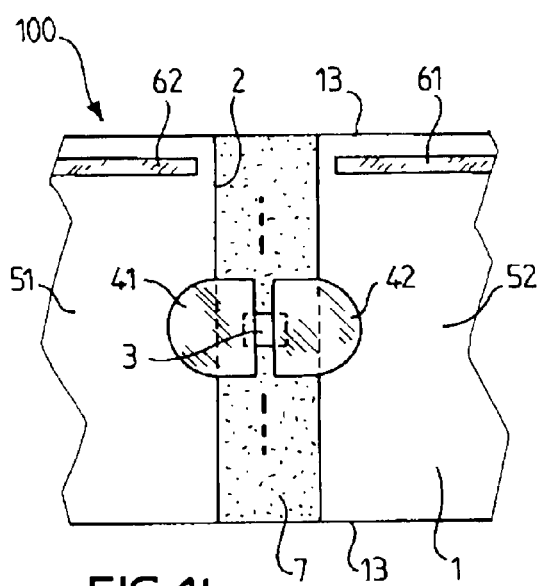

FIGS. 1a and 1b show respectively a schematic, partial sectional view and a schematic, partial top view of a luminous structure 100 with a diode in a first embodiment of the invention.

This luminous structure 100 comprises a planar, for example parallelepipedal, mineral dielectric element, preferably a sheet 1 made of glass having a very low absorption for monochromatic radiation in the visible or even for radiation having several wavelengths in the visible. Thus, a glass with a linear absorption coefficient in the visible of $1.8 \ 10^{-3} \ mm^{-1}$ or less is preferred. Thus, an extra-clear soda-lime glass, for example an ALBARINO glass from Saint-Gobain, with a thickness of 4 or 6 mm may be chosen.

The sheet 1 has first and second parallel main faces 11, 12 and an edge (not visible).

This structure 100 preferably emits direct illumination via the second face 12 by means of diodes 3, the main emission direction (shown symbolically by the arrow) of which is perpendicular to the face of the semiconductor chip 31, for example with an active layer based on multiple quantum wells, in AlInGaP or other semiconductor technology. Each chip has first and second contact layers on the rear face.

Each diode 3 is encapsulated and provided with a focusing lens 32. All colors are conceivable. It is also possible to adjust the power via the supply and/or to use several colors.

These diodes (only one of which is shown in FIG. 1b for the sake of clarity) are housed in a groove 3, for example of rectangular profile or section, made in the first face 11. The section may also be a retention section. The walls and/or the bottom may be curved or faceted.

A transparent filling material 7 (for example of silicone type) fills the spaces between the diodes, between the diodes and the bottom 21, and between the diodes and the side walls 22.

The groove (see FIG. 1b) is straight or, as a variant, has any other shape for a specific arrangement of the diodes according to the desired luminous effect (indicating element, etc.).

The glass pane 1 may furthermore have a multiplicity of mutually parallel grooves housing diodes, for example so as to form an illuminating tile, a luminous wall, etc.

Means for driving the diodes allow the radiation to be emitted permanently or intermittently, with a given color or different colors.

The diodes may form a luminous design, for example a logo or a trademark.

By inserting a large number of diodes, a luminous intensity equivalent to that of incandescent illumination may be obtained, while consuming less power.

This structure may serve for example as decorative or indicating illumination, for example as a luminous panel or partition.

One of the diodes may be replaced with a diode used for remotely controlling the structure, which receives signals in the infrared.

Electrodes 5 on the first face 11, and on either side of the groove 3, are in the form of two transparent conductive layers 51, 52, preferably based on fluorine-doped tin oxide, which are deposited for example by CVD, before the hole is machined. The groove emerges on two opposed sides of the edge 13, thus isolating the electrodes. As a variant or as a complement, it is possible to etch the layer so as to form one or more insulating zones and optionally to address the diodes individually.

One or more transparent conductive layers may be in a stack. One of the transparent layers may be replaced with a semitransparent (especially screen-printed) layer, by a mirror layer, for example made of silver, or by an array of conducting features, especially wires or lines or a mesh.

Power supply members 61, 62 are coupled to the first and second electrodes 51, 52 and are in the form of screen-printed busbars made of silver enamel placed on the periphery (longitudinal or lateral edge) in an easily masked zone.

Each diode 3 is connected to a metallic element, for example made of copper or stainless steel, consisting of two identical parts with an L-shaped profile or section. Thus, the bases of the Ls are connected via their end to a separate electrical contact on the rear face of the chip, and the other ends of the Ls rest largely on the electrodes 51, 52 and are thus in indirect contact with the first main face 11.

The rounded surface of the metal parts 41, 42 is sufficiently broad and the thickness of the electrode sufficiently thin for the glass to contribute significantly to removing the heat produced by the diodes in operation.

Thus, surprisingly, the glass pane 1 has sufficiently good thermal conduction to control the problems of thermal dissipation.

The metallic element 4 is of simple design and has multiple functions. This metallic element is specific to each diode or, as a variant, may be common to a series of diodes.

Each metal part 41, 42 acts as electrical connection element between the diode and the associated electrode, serves as means for keeping the diode(s) in the groove, and therefore to be optically aligned, and masks the diode or diodes.

The metal element has for example a thickness of 0.2 mm and the contact area is around 5 mm$^2$ in the case of "decorative" diodes and 20 mm$^2$ in the case of power diodes. Thus, the metallic element is flush with the hole.

The structure thus presented is compact and robust.

The metallic element 41, 42 may be bonded to the electrodes 51, 52 by a conductive adhesive of the silver type.

Each of the diodes 4 could, in a variant, be in an individual hole. The two metal parts 41, 42 may then for example be at 90°.

The edge of the glass pane (not shown) may be metallized so as to be reflective.

The electrodes are optionally in a multilayer stack and/or may also have one or more of the following additional functions: reflection of the thermal radiation, so as to provide solar control, or reflection of the infrared, for a low-emissivity function.

The main faces may also incorporate a hydrophobic/oleophobic layer, a hydrophilic/oleophilic layer, an antisoiling photocatalytic layer, etc.

Various diode types (batwing diode, side-emitting diode, multiple-color diode) and diode orientations in the hole may be provided. In one configuration, at least one of the diodes can emit radiation, for example UVA or UVC radiation, for exciting a phosphor attached to the main face 12 or replacing the resin 7.

Figure 1C:
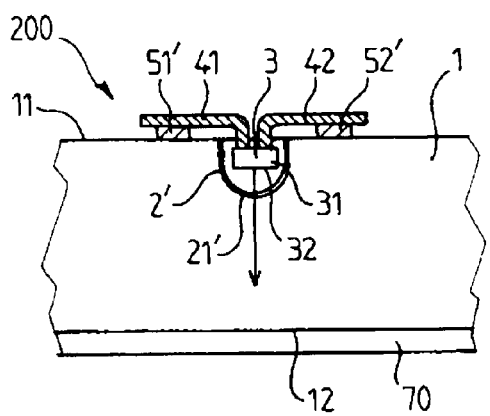
FIGS. 1c and 1d show respectively a schematic, partial sectional view and a schematic, partial top view of a luminous structure 200 having a diode in a second embodiment of the invention.
Figure 1D:
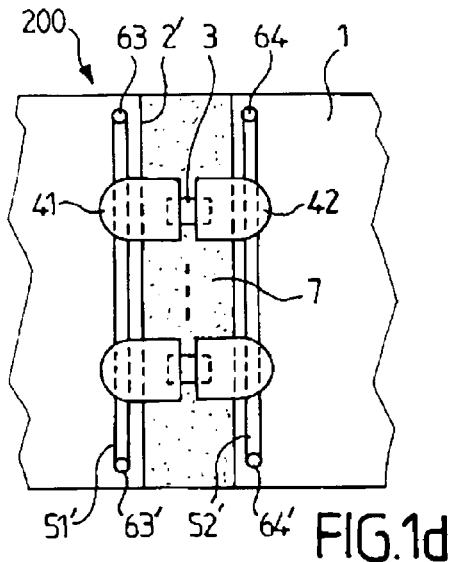

FIGS. 1c and 1d show respectively a schematic, partial sectional view and a schematic, partial top view of a luminous structure 200 having a diode in a second embodiment of the invention.

This luminous structure 200 differs from the structure 100 in the following manner:
- the groove 2' has a concave bottom 21';
- the diodes are bonded in the groove with a suitable adhesive, for example limiting the reflection;
- the electrodes 51', 52' are ink jet tracks with metal, for example silver or copper, (nano)particles, with a width for example of 0.2 mm;
- the busbars are replaced with copper electrical wires (not visible) connected via peripheral spots of solder 63 to 64'; and
- the face 12 comprises a diffusing mineral layer 70.

Furthermore, the metal parts 41, 42 may thus also be in direct contact (by being folded, longer or suitably mounted) with the glass pane 1.

Moreover, these ink jet tracks may be sufficiently adhesive to fasten the metal parts 41, 42.

Figure 1E:
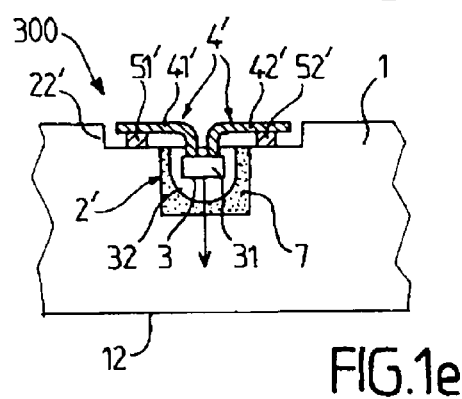
FIGS. 1e and 1f show respectively a schematic, partial sectional view and a schematic, partial top view of a luminous structure 300 having a diode in a third embodiment of the invention.
Figure 1F:
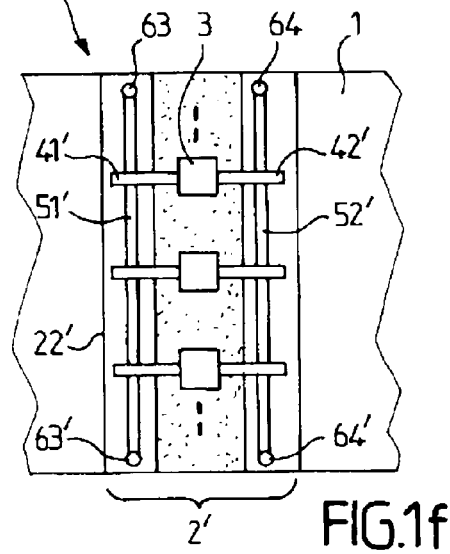

FIGS. 1e and 1f show respectively a schematic, partial sectional view and a schematic, partial top view of a luminous structure 300 with a diode in a third embodiment of the invention.

This luminous structure 300 differs from the structure 200 in the following manner:
- the groove 2' comprises a bore 22' receiving the metal parts 41', 42', and therefore not extending beyond the groove;
- the metal parts 41', 42' are of smaller contact area, for example a rectangular and nonrounded area, which is suitable for a decorative application;
- the electrodes 51', 52' and the spots of solder 63 to 64' are also in the bore 22; and
- the groove 2' has partly a rectangular cross section, with a flat bottom.

Figure 1G:
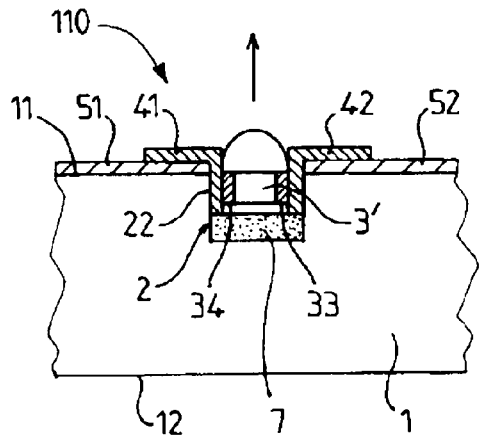
FIGS. 1g and 1h show schematic, partial sectional views of luminous structures 110, 310 having diodes, respectively in variants of the first and third embodiments of the invention.

FIG. 1g shows a schematic, partial sectional view of a luminous structure 110 with diodes in a variant of the first embodiment of the invention.

This luminous structure 110 differs from the structure 100 in the following manner: the diodes 3' are side-emitting diodes and in an inverted position so as to emit radiation toward the face 11, their contacts 33, 34 then being bonded (using a silver adhesive or the like) or held in place by pressure on the metal parts 41, 42 bearing on the side walls 22 of the groove 2.

Furthermore, the space between the face on the opposite side to the emission face and the bottom is filled with the resin 7 (the filling taking place via the edge).

The diodes may also rest on the bottom 21 or be bonded to the bottom (via a dielectric adhesive).

The edge is not necessarily metallized.

Figure 1H:
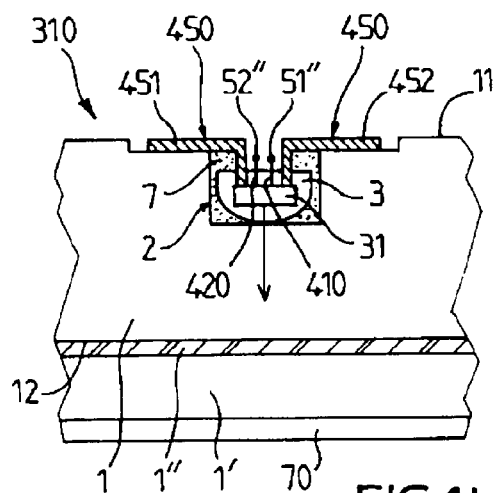

FIG. 1h shows a schematic, partial sectional view of a luminous structure 310 with diodes, in a variant of the third embodiment of the invention.

This luminous structure 310 differs from the structure 300 in the following manner:
- the metal parts 451, 452 do not act as electrical connection elements, and are therefore connected to insulating zones on the rear face of the chip 31;
- thin electrical wires 410, 420 for example made of gold, and preferably housed in the groove 2, are connected to wire electrodes 51", 52"; and the structure 310 is laminated and comprises, in addition, a lamination interlayer 1", which is preferably diffusing, for example a translucent PVB, and a glass back pane 1' with a mineral diffusing layer 70 for a second level of diffusion.

Figure 2A:
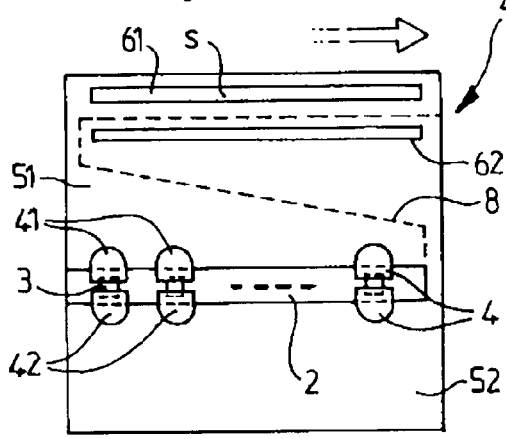
FIGS. 2a and 2b show schematically front views of luminous structures 400, 410 having a diode in a fourth embodiment of the invention and in a variant.

FIG. 2a shows schematically a front view of a luminous structure 400 with a diode in a fourth embodiment of the invention.

This structure serves as a sliding door 400 (which can move to the right, as shown by the thick arrow) security-protected by the diodes 3.

The diodes are aligned in a groove formed in a main face of the glass and emerging on only one side of the edge. This main face has two electrodes in the form of transparent conductive layers 51, 52 separated, for example by etching, by an insulating layer 8. Each of the electrodes is supplied via a busbar 61, 62, for example running along the same edge of the glass pane and separated by the insulating zone 8.

Diode drive means (not visible) are used to emit the radiation intermittently according to the position of the door and using a pulsed signal s (of rectangular waveform, etc.). For example, when the door is closed or almost closed, the diodes 3 are lit and when the door opens, for example after a person has been detected, the diodes are lit or they flash.

Figure 2B:
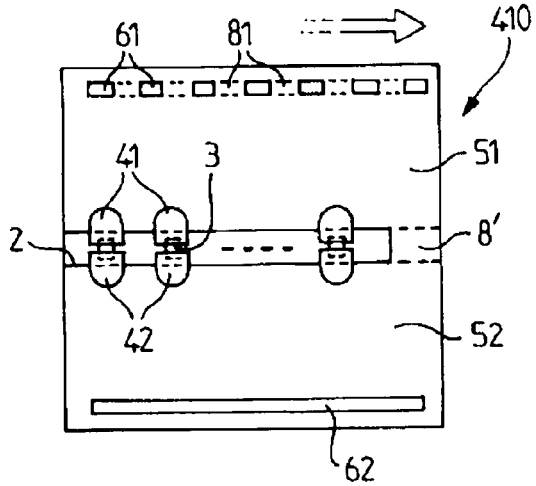

FIG. 2b shows schematically a front view of a luminous structure 410 with a diode in a variant of the fourth embodiment of the invention.

This structure serves as a sliding door 410 (which can move to the right, as indicated by the double-sided arrow) and differs from the structure 400 in that:

a first insulating zone 8' is limited to a zone between the groove and the edge (or even omitted if the groove becomes an emergent groove on both sides); and
the first and second busbars 61, 62 are located respectively on the top and the bottom of the door, the first busbar being discontinuous and these discontinuities coinciding with insulating zones 81 for the first electrode 51.

The diodes emit radiation (in the red, green, etc.) intermittently when a mechanical contactor (castor or the like) is on one of the zones of the busbar 61.

Preferably, the glass pane 1 is thick and toughened.

As a variant, this system is incorporated into a hinge door, positioning the connections suitably on a longitudinal edge.

Figure 3A:
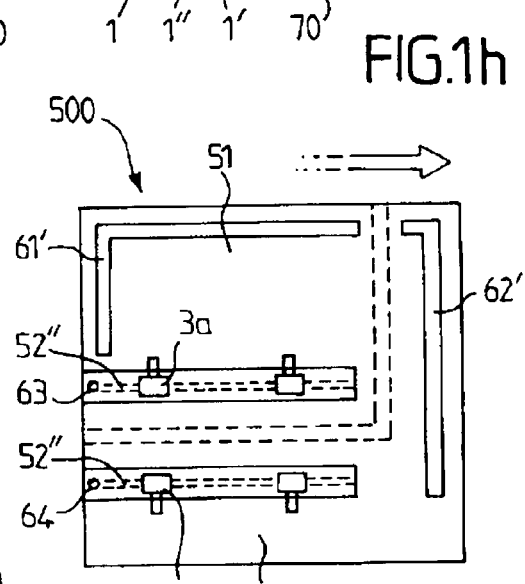
FIGS. 3a and 3b show respectively a schematic, partial front view and a schematic, partial sectional view of a luminous structure 500 with a diode in a fifth embodiment of the invention.
Figure 3B:
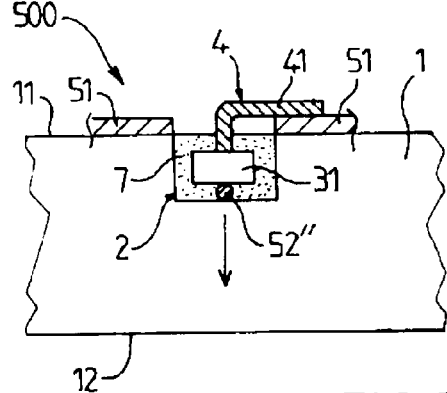

FIGS. 3a and 3b show respectively a schematic, partial front view and a schematic, partial sectional view of a luminous structure 500 with a diode in a fifth embodiment of the invention.

This structure acts as a sliding door 500 (which can move to the right as shown by the double-sided arrow) differs from the structure 400 in that:

the arrangement of the first and second busbars 61', 62' in contiguous edges;
the number of grooves receiving diodes 3a, of different color, the diodes 3a being red in one row and the diodes 3b being green in the other; and
the arrangement of the insulating zone 8 separating an electrode 51 into two electrodes of the same polarity, each connected to a busbar 61', 62'.

Furthermore, the diodes 3 are simple semiconductor chips 31 having contacts on opposed faces. Their arrangement is shown in FIG. 3b. The second electrode 52" is a thin conducting wire bonded to the bottom of the groove 2 and to the front (emitting) faces of all the diodes (at their center or on the edge).

When the door is closed or almost closed, the red diodes 3b are lit and when the door opens the green diodes are lit.

The metallic element 4 comprises a single metal part 41 of L-shape.

Figure 3C:
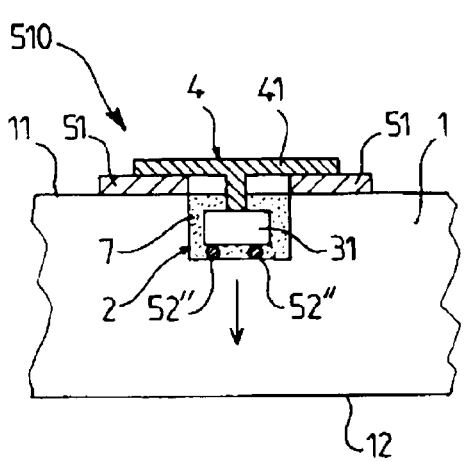
FIG. 3c shows a schematic, partial sectional view of a luminous structure 510 with a diode in a fifth embodiment of the invention.

FIG. 3c shows a schematic, partial sectional view of a luminous structure 510 with a diode in a variant of the fifth embodiment of the invention, differing by the peripheral arrangement of two thin wires 52" forming electrodes, by the T-shaped cross section of the metallic element 4 and by a first electrode 51 of reduced width.

Figure 4C:
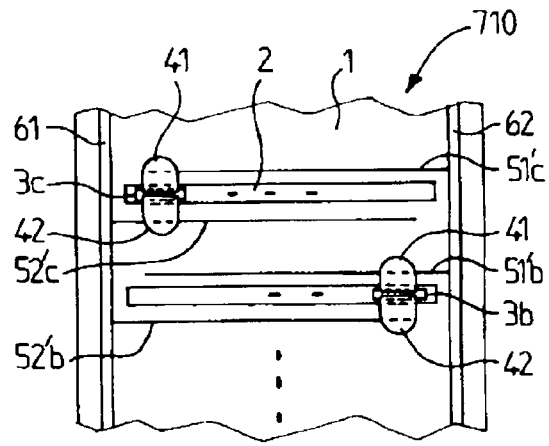
FIG. 4c shows a schematic, partial front view of a luminous structure having diodes in another embodiment of the invention.
Figure 4A:
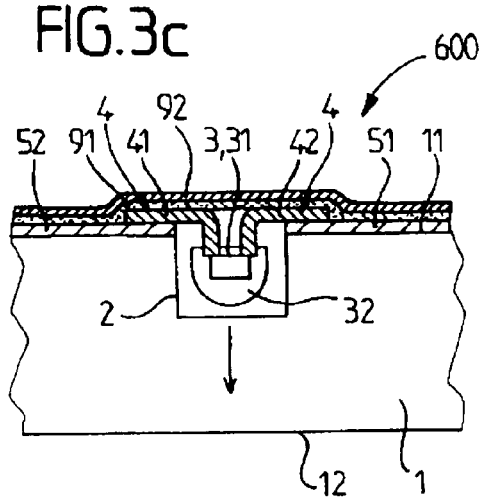
FIG. 4a shows a schematic, partial sectional view of a luminous structure 600 with a diode in a sixth embodiment of the invention.

FIG. 4a shows a schematic, partial sectional view of a luminous structure 600 with a diode in a sixth embodiment of the invention.

This luminous structure 600 differs from the structure 100 on a number of accounts. The metallic element 4 is covered:

by an electrically insulating and thermally conducting film 91, based on a silicone that includes mineral fillers; and
by a metal foil of the copper type or graphite type 92, for example as optical reflector, or made of silver or aluminum.

This cover, which further improves the thermal dissipation management, is particularly suitable for high-power diodes and for applications having a high level of illumination (backlighting of liquid crystal displays for example, or an architectural lamp).

The transparent layers may be replaced with semitransparent (screen-printed) layers, or by mirror layers, for example made of silver.

Figure 4B:
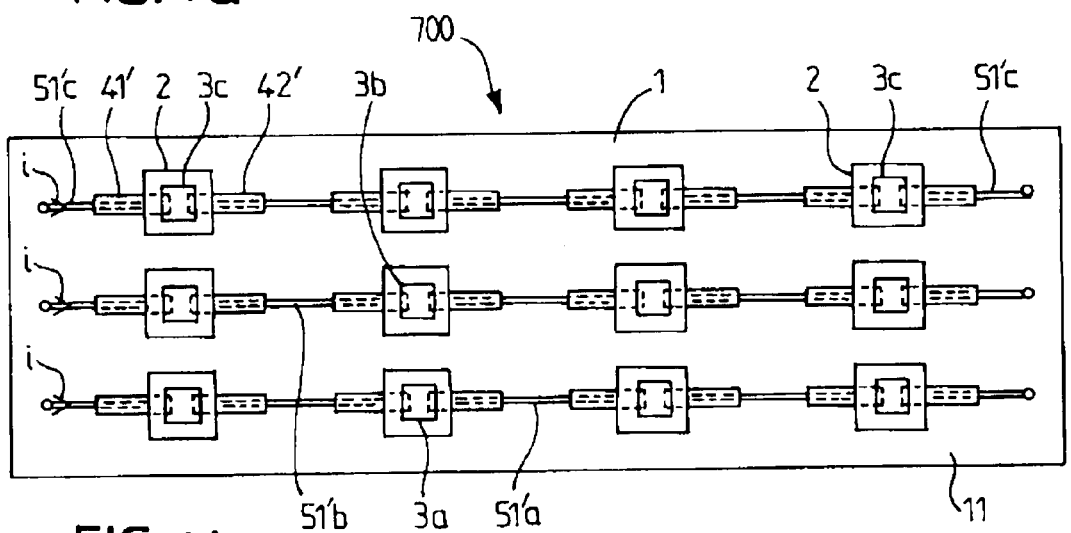
FIG. 4b shows a schematic, partial front view of a luminous structure having diodes in a seventh embodiment of the invention.

FIG. 4b shows a schematic, partial front view of a luminous structure 700 with diodes in a seventh embodiment of the invention.

The luminous structure 700 comprises three rows of diodes 5a to 5c, of respectively red, green and blue color (or of the same color) which are parallel to the longitudinal edges. Each diode 5a to 5c is in an individual hole, for example of square or circular base and for example with a retention profile. Each diode is held in place by a metallic element in the form of two parts of L-shaped cross section, for example similar to that described in the case of the first embodiment.

Each row of diodes is supplied with current i via a discontinuous ink jet track 51'a to 51'c or, as a variant, a discontinuous transparent electroconductive layer or a discontinuous screen-printed layer. The metal parts 41', 42' serve for electrically connecting the associated track 51'a to 51'c.

The diodes may be arranged so as to form a logo, the track then being modified so as to maintain the power supply.

FIG. 4c shows a schematic, partial front view of a luminous structure 710 with diodes in another embodiment of the invention.

The luminous structure 710 comprises:

a plurality of first, preferably ink-jet, conducting tracks 51'a to 51'c approximately parallel to one another and connected at one end to a common busbar 61 running along a lateral edge;
a plurality of second approximately parallel conducting tracks 52'a to 52'c alternating with the first conducting tracks to a common busbar 62 running along the other lateral edge; and
a plurality of grooves, each inserted between first and second tracks forming first and second electrodes, preferably parallel to these tracks, these grooves housing the diodes, and metallic elements serving as electrical connection and retaining elements.

Each diode 3a, 3b, 3c is connected to an individual metallic element, in the form of two identical parts 41, 42 of L-shaped profile. Each row may emit a given color.

The luminous structure 710 may serve as a decorative or architectural flat lamp.

Figure 5A:
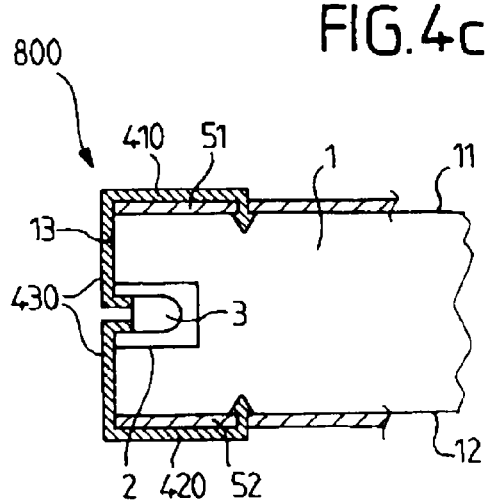
FIGS. 5a and 5b show schematic, partial sectional views of luminous structures 800, 810 having diodes in an eighth embodiment of the invention and in a variant.
Figure 5B:
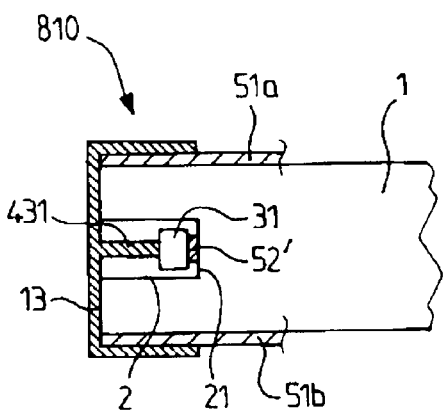

FIGS. 5a and 5b show schematic, partial sectional views of luminous structures 800, 810 with diodes in an eighth embodiment of the invention and in a variant.

The luminous structure 800 comprises a glass sheet 1, for example with a thickness of 4 or 6 mm, the glass preferably having a very low absorption for monochromatic radiation in the visible or even radiation of several wavelengths in the visible. Thus, an extra-clear soda-lime glass may be chosen.

The sheet 1 has first and second parallel main faces 11, 12 and an edge 13.

The sheet is a lightguide, the light being extracted via one or both main faces 11, 12.

The diodes 3 are housed in a groove made in the edge 13. Each diode 3 is encapsulated and provided with a focusing lens 32. All colors are conceivable. It is also possible to regulate the power via the supply and/or to use several colors.

The glass pane 1 may furthermore include other grooves housing diodes, for example on the opposite edge.

Diode drive means are used to emit radiation permanently or intermittently, with a given color or with different colors, or to address the diodes.

Each diode 3 is connected to a metallic element. The metallic element is of simple multi-function design.

Each metallic element serves to keep one or more diodes in the groove, serves for optical alignment and serves for masking the diodes. It comprises three substantially planar thin portions:

two main portions 410, 420 on the main faces 11, 12; and
a two-part side portion 430 in contact with the light injection edge 13.

The two main portions 410, 420 are provided with tabs engaging in notches made on the main faces 11, 12.

Each portion 410, 420, 430 furthermore acts as an electrical connection element between the diode 3 and the electrodes, for example in the form of transparent electroconductive layers 51, 52 placed on the main faces 11, 12. One of the electrodes 51, 52 may be a mirror, for example made of aluminum or silver. The opposite edge may be metallized.

The structure 810 shown in FIG. 5b varies from the structure 800 on several points. The metallic element 4 has an E-shaped cross section and is capable of gripping the edge 13.

Each diode is a simple semiconductor chip 31 with electrical contacts on opposed faces and is held in place by the central metal part 431 of the E.

The two main faces 11, 12—or as a variant just one—comprise a first electrode of the transparent electroconductive layer type, 51a, 51b. The bottom 21 of the groove, which is preferably wide, includes a second electrode 42', for example in the form of an ink jet track bonded to and/or in simple contact with the emitting face, or in the form of a conducting wire.

By inserting a large number of diodes, a luminous intensity equivalent to that of incandescent illumination may be obtained, while requiring lower power consumption.

This structure may for example serve for decorative or indicating illumination, for example as a luminous panel or partition.

One of the diodes may be replaced with a diode used for remotely controlling the structure, which receives signals in the infrared.

One of the transparent layers may be replaced with a semitransparent (for example screen-printed) layer, with a mirror, for example made of silver or aluminum, or with an opaque colored layer (enamel, etc.), for example so as to make the diode invisible on one side of the structure.

The opposed edge may be metallized.

Figure 6A:
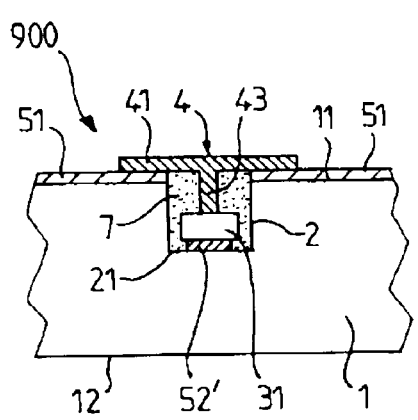
FIGS. 6a and 6b show schematic, partial sectional views of luminous structures 900, 910 having diodes in a ninth embodiment of the invention and in a variant.
Figure 6B:
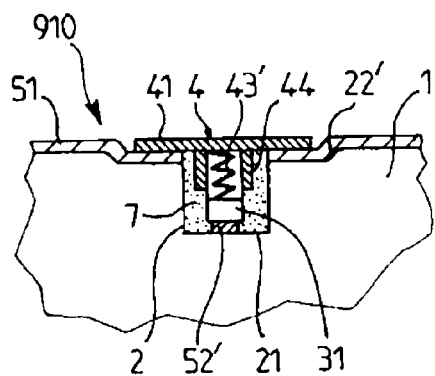

FIGS. 6a and 6b show schematic, partial sectional views of luminous structures 900, 910 with diodes in a ninth embodiment of the invention and in a variant.

The structure 900 differs from the structure 100 on several accounts:

the metallic element is made as one piece (pierced for filling with the material 7) and of T-shaped cross section;
the diodes have contacts on opposed faces and are not encapsulated (simple conducting chips 31);
the first electrode 51 is in two parts on either side of the groove (or even on just one side); and
the groove is wide and the second electrode 52' is an ink jet track (or a thin conducting wire) in the bottom 21 of the groove 2.

The diodes may form a luminous design, for example a logo or a trademark.

By inserting a large number of diodes, a luminous intensity equivalent to that of incandescent illumination may be obtained, while requiring lower power consumption.

This structure may for example serve for decorative or indicating illumination, for example as a luminous panel or partition.

One of the diodes may be replaced with a diode used for remotely controlling the structure, which receives signals in the infrared.

The structure 910 differs from the structure 900 on several accounts:

the hole comprises a bore 22' covered with the electroconductive layer 51 forming the first electrode; and
the metallic element 4 comprises a central spring 43' guided along its axis by metal walls 44.

Figure 7A:
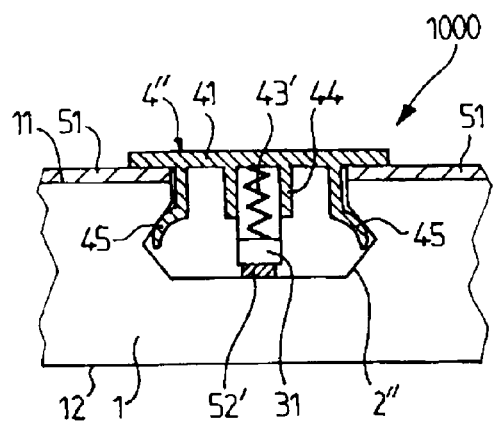
FIGS. 7a and 7b shows schematic, partial sectional views of luminous structures 1000, 1010 having diodes in a tenth embodiment of the invention and in a variant.
Figure 7B:
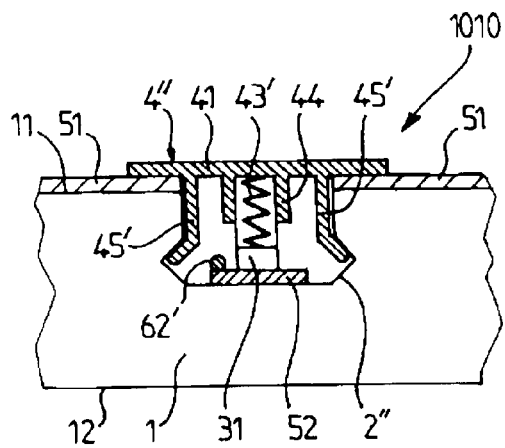

FIGS. 7a and 7b show schematic, partial sectional views of luminous structures 1000, 1010 with diodes in a tenth embodiment of the invention and in a variant.

The structure 1000 differs from the structure 910 on several accounts:

the groove 2' (or individual holes) has a retention profile, the side walls flaring out laterally, thus forming a "< >";
the metallic element 4" comprises one or more metallic elements 45 of shape substantially complementary to the walls of the groove, for self-locking; and
the hole is not bored.

The diodes may form a luminous pattern, for example a logo or a trademark.

By inserting a large number of diodes, a luminous intensity equivalent to that of incandescent illumination may be obtained, while requiring lower power consumption.

This structure may for example serve for decorative or indicating illumination, for example as a luminous panel or partition.

One of the diodes may be replaced with a diode serving for remotely controlling the structure, which receives signals in the infrared.

The first electrode 51 may be replaced with a semitransparent (screen-printed) layer, with a mirror layer, for example made of silver, or with an array of wires and an opaque colored layer (of enamel, etc.), for example so as to make the diodes invisible on one side of the structure.

The structure 1010 differs from the structure 1000 in that:
the elements 45' are straight;
the second electrode 52 is a transparent electroconductive layer like the first electrode 51; and
an interconnection wire 62' is soldered to this second electrode 52.

An example of the manufacture of this structure 1010 is the following:
machining of the hole 2", optionally with a bore;

deposition of a conductive layer by CVD, forming, by the effect of shadowing of the enlarged walls, two electrodes 51, 52 on the main face 11 and the bottom of the hole;

placement and soldering of the interconnection wire 62' and insertion and bonding to the silver of the chips 31 (or vice versa); and mounting of the common metallic element 4" or of the individual metallic elements.

The structure according to the invention is not necessarily symmetrical. It is possible to use electrodes made of different material or produced in different technology and connection members made of different material or produced in different technology.

Hybrid arrangements, with individual holes and common holes, may be provided.

The transparent electroconductive layers may be thin functional conductive layers, especially metal, preferably silver, layers placed between thin dielectric layers, which are:

optionally, a blocking layer directly on the silver layer, based on metal, substoichiometric oxide metal alloy of a metal, metal alloy; and a layer based on metal oxide, for example optionally aluminum-doped zinc oxide, and/or a silicon nitride layer, etc.

The invention claimed is:

1. A luminous structure comprising:
    at least one light-emitting diode of emitting radiation within the ultraviolet (UV) or the visible spectrum;
    a substantially planar glass element having upper and lower main faces and an edge around a periphery of the upper and lower main faces, the glass element having a hole on one of the main faces or a side wall thereof housing the diode; and
    a metallic element connected to the diode and coupled with said glass element for removing heat, said metallic element electrically connecting the diode and the glass element and holding the diode in said hole, wherein
    the metallic element contacts at least one of the main faces or the edge or the side wall of the glass element forming the hole.

2. The luminous structure as claimed in claim 1, wherein a functional element having one or more layers or one or more wires is inserted between the glass element and the metallic element.

3. The luminous structure as claimed in claim 1, wherein the metallic element is incorporated into the hole or flush with the hole.

4. The luminous structure as claimed in claim 1, wherein the metallic element is a piece with a T-shaped, E-shaped or L-shaped cross section or a two-part piece of L-shaped cross section.

5. The luminous structure as claimed in claim 1, wherein the metallic element is a holding element and is self-blocking in the hole having a retaining profile.

6. The luminous structure as claimed in claim 1, wherein the metallic element is a holding element and includes a spring in contact with the diode.

7. The luminous structure as claimed in claim 1, wherein, the hole is in the edge and the metallic element comprises three substantially planar portions:
    two main portions in contact with the main faces; and
    a side portion in contact with a part of the edge,
    said holding element gripping the edge or the two main portions being provided with tabs that engage in notches made on the main faces.

8. The luminous structure as claimed in claim 1, wherein the metallic element is covered by an electrically insulating and thermally conducting element placed beneath a metal foil.

9. The luminous structure as claimed in claim 1, wherein the hole has a width of 2 mm or more.

10. The luminous structure as claimed in claim 1, wherein the hole receives the metallic element.

11. The luminous structure as claimed in claim 1, further comprising a plurality of diodes supplied with current or with voltage.

12. The luminous structure as claimed in claim 1, further comprising first and second electrodes in contact with the metallic element, the electrodes placed respectively on the same main face, or on both main faces, or in the bottom of the hole and outside the hole.

13. The luminous structure as claimed in claim 12, wherein at least one of the first and second electrodes is chosen from a transparent conducting array or a conducting, transparent, layer optionally covered with one or more thin or leaky dielectric layers.

14. The luminous structure as claimed in claim 1, further comprising at least one electrode or a power supply member being an ink jet track with metal (nano) particles or being screen-printed.

15. The luminous structure as claimed in claim 1, wherein the diode is chosen from one or more of the following diodes:
    a diode with electrical contacts on opposing faces of the chip or on the same face of the chip or a side-emitting diode;
    a diode with a focusing lens or a diode comprising an unencapsulated chip;
    a diode having a main emission direction being perpendicular or oblique, or a diode having two main emission directions that are oblique with respect to the emitting face of the chip, giving a batwing shape, or a diode having only two oblique main emission directions; and
    a diode for guiding in the edge or for direct emission via one or both faces or via the hole.

16. The luminous structure as claimed in claim 1, further comprising a plurality of diodes and means for driving the diode so as to emit the radiation either permanently or intermittently, with a given color or different colors.

17. The luminous structure as claimed in claim 12, wherein the structure is movable, so as to form a glass door, and
    the structure includes a plurality of diodes aligned in the hole forming a groove and formed in the main face provided with the first and second electrodes, and means for driving the diodes so as to emit the radiation intermittently, depending on a position of the door, by a break in the power supply.

18. The luminous structure as claimed in claim 1, further comprising:
    a plurality of first conducting, substantially parallel tracks connected to a common power supply member;
    a plurality of second conducting, substantially parallel, tracks alternating with the first conducting tracks and supplied via another common power supply member; and
    a plurality of forming grooves each inserted between first and second tracks forming first and second electrodes, the grooves housing diodes and metallic elements serving as electrical connection and holding elements.

19. The luminous structure as claimed in claim 1, wherein the glass element is made of a clear soda-lime-silica glass.

20. The luminous structure as claimed in claim 1, wherein at least one edge part is reflecting.

21. The luminous structure as claimed in claim 1, further comprising a mineral diffusing layer associated with one of the main faces, the mineral diffusing layer being a luminous face.

22. The luminous structure as claimed in claim 1, wherein the glass element is a lightguide and the lightguide is monolithic.

23. The luminous structure as claimed in claim 1, further comprising a laminated glazing unit formed from one of a chosen mineral guide, a glass sheet, a diffusing lamination interlayer and a glass back pane.

24. The luminous structure as claimed in claim 1, wherein the structure forms an illuminating, decorative, architectural or indicating glazing.

25. A process for manufacturing the luminous structure having a diode as claimed in claim 1, comprising the steps of:
   machining of the hole; and
   deposition of a conducting layer forming two electrodes on one of the main faces.

26. The process for manufacturing the luminous structure as claimed in claim 25, further comprising a step of toughening the glass element.

27. The process for manufacturing the luminous structure as claimed in claim 25, wherein the machining gives the hole a retaining profile.

28. The process for manufacturing the luminous structure as claimed in claim 25, wherein the machining of the hole forms a bore for housing said metallic element.

29. The luminous structure as claimed in claim 4, wherein the piece has a thickness of 0.2 mm or less.

30. The luminous structure as claimed in claim 8, wherein the electrically insulating and thermally conducting element comprises a silicone including mineral fibers.

31. The luminous structure as claimed in claim 10, wherein the hole receives one or more electrodes or a power supply member.

* * * * *